Dec. 15, 1936. H. J. DICK 2,063,988

REFRIGERATING APPARATUS

Original Filed July 31, 1934

Inventor
Herman J. Dick.
By Spencer, Hardman and Fehr.
his Attorneys.

Patented Dec. 15, 1936

2,063,988

UNITED STATES PATENT OFFICE 2,063,988

REFRIGERATING APPARATUS

Herman J. Dick, Dayton, Ohio, assignor to General Motors Corporation, Dayton, Ohio, a corporation of Delaware Application July 31, 1934, Serial No. 737,782
Renewed October 8, 1935

5 Claims. (Cl. 257—252)

This invention relates to refrigerating apparatus and particularly to heat exchange elements employed in such apparatus.

In the construction of heat exchange units or elements, such as evaporators for refrigerating systems, wherein a plurality of lengths of pipe or conduit are to be arranged or disposed in a limited space, in order to provide maximum heat exchange or cooling surfaces therein, the plurality of lengths of conduit or pipe must be disposed relatively close to one another. It has been found to be impractical to form reverse turns or U-bends in a continuous length of tubing in order to position a plurality of straight lengths of the tubing closely adjacent and parallel to one another. For instance metallic tubing tends to crack or split upon being formed into a reverse turn or U-bend of such small radius as is required to position or locate straight lengths thereof closely adjacent and parallel to one another thus rendering the tubing unfit for use. In addition bending of a continuous length of metallic tubing upon a small radius to provide a sharp U-bend or reverse turn therein causes the walls of the tubing to collapse or to move toward one another, thus forming a restriction or obstruction in the tubing which impedes the flow of a fluid medium therethrough. For various reasons, therefore, it is not entirely satisfactory to form reverse turns or U-bends of a heat exchanger in a continuous length of tubing.

An object of the present invention is to provide an improved heat exchange element such as an evaporator for a refrigerating system by increasing the heat transference surface thereof without materially increasing its overall dimension.

Another object of the invention is to provide an improved heat exchanger or evaporator having a header at each end of a column of parallelly arranged pipes which headers are divided into a plurality of separate or individual conduits communicating with the ends of certain of the pipes but closed off from the corresponding ends of certain other of the pipes to provide a serpentine or series refrigerant flow circuit through the evaporator between the inlet and outlet connections thereof.

In carrying out the foregoing object it is a still further object of the invention to construct the headers of the evaporator, which receive the ends of the substantially parallelly extending pipes, from a plurality of cup-like conduit members secured together in end to end relation so as to position the parallel pipes closely adjacent one another to form an evaporator having a maximum of heat transference surface within a given space.

Further objects and advantages of the present invention will be apparent from the following description, reference being had to the accompanying drawing, wherein a preferred form of the present invention is clearly shown.

Figure 1:
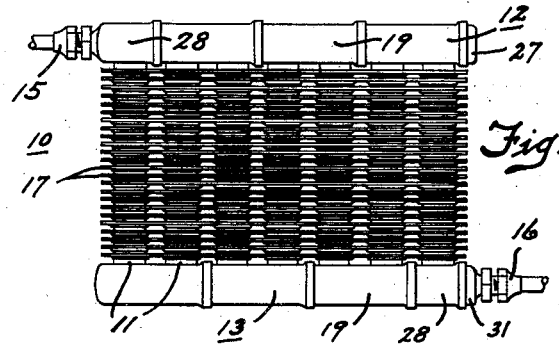
Fig. 1 is a front elevational view of a heat exchange element or evaporator constructed in accordance with my invention.
Figure 2:
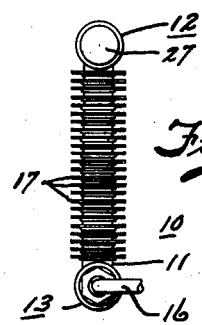
Fig. 2 is an elevational end view of the evaporator shown in Fig. 1.

Referring to the drawing, for the purpose of illustrating the invention, I have shown in Fig. 1 thereof a heat exchange element or unit, generally designated by the reference character 10, which element or unit is preferably in the form of an evaporator of a refrigerating system. The evaporator 10 comprises a plurality of substantially parallel straight lengths of pipe 11 disposed in alignment with one another. The lengths of pipe 11 are preferably of copper material although pipes formed of other material may be employed if desired. One header 12 of a pair thereof is located at one end of the pipe 11 and is secured to the pipes in communicative relation while the other header 13 of said pair of headers is located at the opposite end of pipes 11 and is also secured to the pipes in communicative relation therewith. The header 12 is provided with a pipe connection 15 and the header 13 is provided with a pipe connection 16 at the end of the evaporator opposite the end thereof in which the pipe connection 15 is located. Either of the pipe connections 15 or 16 may serve as a refrigerant inlet or an outlet for the evaporator 10 in accordance with the direction of flow of refrigerant through the evaporator desired. The heat exchanger disclosed being employed preferably as an evaporator of a refrigerating system, one of the connections 15 or 16 would communicate with a refrigerant flow control device such as a restrictor, expansion or float valve for controlling the entrance of the refrigerating fluid to the exchanger. The exchanger or evaporator 10 may include a plurality of relatively thin cross fins 17. These fins 17 increase the heat transference surface of the evaporator and tend to reduce the temperature gradient between the plurality of individual pipes 11 while at the same time aiding in maintaining the pipes 11 in rigid spaced apart relation to form a unitary structure.

Figure 3:
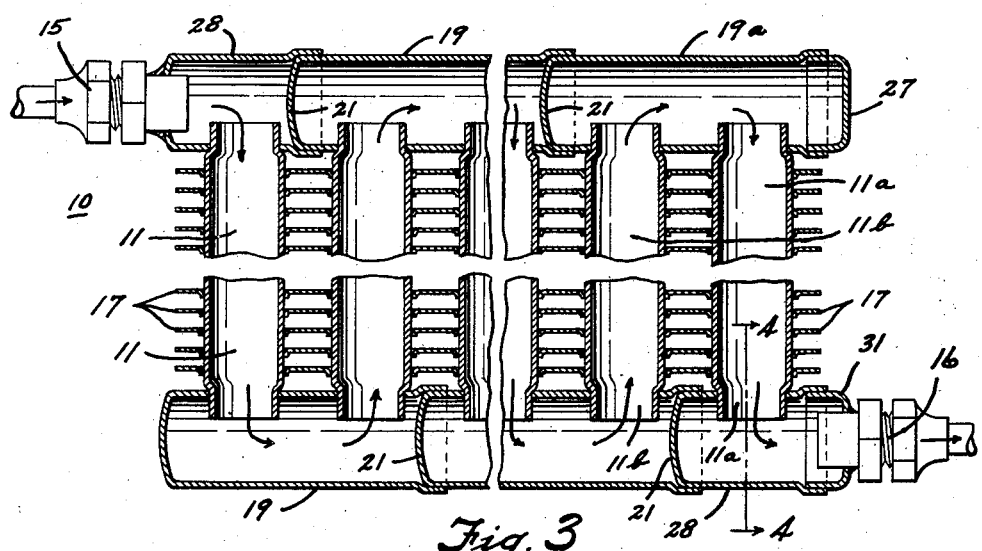
Fig. 3 is an enlarged fragmentary sectional view of the evaporator shown in Fig. 1.
Figure 4:
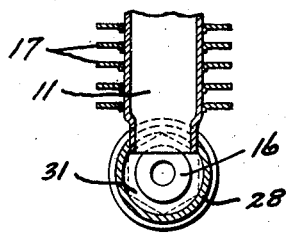
Fig. 4 is an enlarged sectional view taken on the line 4—4 of Fig. 3.
Figure 5:
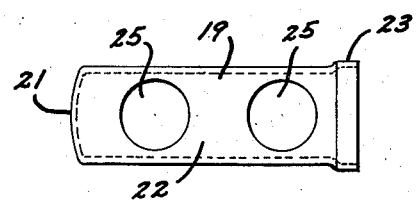
Fig. 5 is a plan view of one of the cup-like conduit members employed in the formation of the headers of the evaporator.
Figure 6:
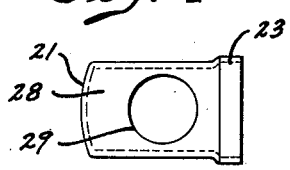
Fig. 6 is a plan view of another of the cup-like conduit members employed in the formation of the headers of the evaporator.

Each of the headers 12 and 13 are formed or constructed by securing a plurality of hollow cup-like conduit members 19 in substantially telescoping or end to end relation. The cup-like members 19 include a bottom wall 21 and cylindrical side walls 22 (see Fig. 5). The portion adjacent the open end of the cups 19 is extended or expanded outwardly as at 23 so as to provide an enlarged open end for receiving therein a closed end of another of the cups 19. The cylindrical side wall 22 of each of the cup members 19 is provided with two openings 25 each of which openings receive an end of one of the parallel pipes 11. The cup-like conduit members 19 in header 12 are arranged in staggered relation relative to the cup-like members 19 in header 13. By referring to Fig. 3 of the drawing it will be noted that the one cup-like member 19a has its open end closed by a plug 27 and that cup-like member 19a is connected to the ends of the two pipes 11a and 11b respectively. The bottom or end wall 21 of cup-like member 19a prevents communication of the connected ends of pipes 11a and 11b with the cup-like member 19 adjacent the member 19a. The staggered relation of the cup members 19 relative to one another in the two headers 12 and 13 necessitates the use of a short cup-like member at one end of each header. A cup-like member 28 suitable for use in the formation of the headers 12 and 13 as explained is disclosed in Fig. 6 of the drawing. Cup member 28 is similar in construction and formation to the members 19 and is provided with but a single opening 29 for the reception of a pipe 11. Again referring to Fig. 3 it will be noted that the end of pipe 11a opposite the end thereof which is in communication with the pipe 11b is attached to one of the short cup-like members 28. The bottom or end wall of cup member 28 prevents communication of pipes 11a and 11b at their ends opposite the connected ends thereof. A plug 31 closes the open end of the short cup member 28 and has the connection 16 secured thereto in any suitable manner. It is to be understood that the arrangement of the cup-like member 28 at the opposite end of the evaporator is similar to the end arrangement just described and that the staggered arrangement of the cup-like members 19 necessitate locating one of the short cup-like members 28 in header 12 to which the connection 15 is secured. It will be understood from the present disclosure and explanation of the staggered arrangement of the cup-like members 19 that one cup member 19 in header 12 connects the corresponding ends of two pipes 11 while the bottom or end portion 21 of the cup members in header 13 at the ends opposite the connected ends of pipes 11 prevent communication between the opposite ends of the two pipes. The arrangement of the cup-like members 19 and 28 to provide the headers 12 and 13 obviously forms a serpentine or series path of flow for a refrigerating fluid between the inlet and outlet connections 15 and 16 respectively of the evaporator.

From the foregoing it will be apparent that I have provided an improved evaporator for a refrigerating system in which evaporator a series path of flow for the refrigerating fluid is provided by means which permits the extended heat exchanging surfaces or pipes of the evaporator to be positioned closely adjacent and parallel to one another. Thus a heat exchanger or evaporator having a maximum amount of heat exchanging or cooling surface is provided without materially increasing the overall dimensions of an evaporator. My invention therefore provides an evaporator having a great amount of cooling surface while at the same time being much smaller and compact as compared to conventional evaporators of equal cooling capacity in which a series flow circuit for a refrigerating fluid is provided.

While the form of embodiment of the invention as herein disclosed, constitutes a preferred form, it is to be understood that other forms might be adopted, all coming within the scope of the claims which follow.

What is claimed is as follows:

1. An evaporator for a refrigerating system having an inlet and an outlet connection comprising in combination, a plurality of lengths of pipe, header means at each end of said pipes for positioning portions of the pipes relatively close together in substantially parallel relation, said header means including a plurality of cup-like conduit members secured together in end to end relation, and said cup-like conduit members connecting the corresponding ends of certain of said pipes in communicative relation and preventing communication of said connected pipe ends with the corresponding ends of other of said plurality of pipes to provide a refrigerant flow circuit through the evaporator connected in series with said inlet and said outlet connections thereof.

2. An evaporator for a refrigerating system having an inlet and an outlet connection comprising in combination, a plurality of lengths of pipe, header means at each end of said pipes for positioning the pipes relatively close together in substantially parallel relation throughout their length, said header means including a plurality of cup-like conduit members secured together in end to end relation, and said cup-like conduit members connecting the corresponding ends of certain of said pipes in communicative relation and preventing communication of said connected pipe ends with the corresponding ends of other of said plurality of pipes to provide a refrigerant flow circuit through the evaporator connected in series with said inlet and said outlet connections thereof.

3. An evaporator for a refrigerating system having an inlet and an outlet connection comprising in combination, a plurality of lengths of pipe, header means at each end of said pipes for positioning the pipes relatively close together in substantially parallel relation throughout their length, each of said header means including a plurality of cup-like conduit members secured together in end to end relation, the cup-like conduit members of one of said header means connecting corresponding ends of two of said pipes in communicative relation and preventing communication of said two connected pipe ends with the corresponding ends of other of said plurality of pipes, and the cup-like conduit members of the other of said header means being arranged in staggered relation relative to the cup-like conduit members of said one of said header means for preventing communication between the ends opposite the connected ends of said two pipes and for permitting communication of the opposite end of one of said two connected pipes with an end of another of said plurality of pipes to provide a refrigerant flow circuit through the evaporator connected in series with said inlet and said outlet connections thereof.

4. A heat exchange element for a refrigerating system having an inlet and an outlet connection comprising in combination, a plurality of lengths of pipe, header means at one end of said pipes for positioning the pipes relatively close together, said header means including a plurality of cup-like conduit members secured together and extending in the same plane with one another along the ends of said pipes, each of said plurality of cup-like conduit members forming a return bend at the ends of certain of said pipes for connecting said certain of said pipes in communicative relation, and the end of one of said cup-like conduit members closing the open end of another of said cup-like conduit members to prevent communication between said certain of said pipes and other pipes of the heat exchange element.

5. A heat exchange element for a refrigerating system having an inlet and an outlet connection comprising in combination, a plurality of lengths of pipe, header means at one end of said pipes for positioning the pipes relatively close together, said header means including a plurality of cup-like conduit members secured to one another in telescoped relationship and extending in the same plane with one another along the ends of said pipes, each of said plurality of cup-like conduit members forming a return bend at the ends of certain of said pipes for connecting said certain of said pipes in communicative relation, and the end of one of said telescoped cup-like conduit members closing the open end of another of said cup-like members to prevent communication between said certain of said pipes and other pipes of the heat exchange element to provide a fluid flow circuit through the heat exchange element connected in series with said inlet and said outlet connections thereof.

HERMAN J. DICK.